United States Patent [19]

Anderson et al.

[11] Patent Number: 6,154,576
[45] Date of Patent: Nov. 28, 2000

[54] SYSTEM AND METHOD FOR ANTI-ALIASING OF TEXT OVERLAYS ON ELECTRONIC IMAGES

[75] Inventors: Eric Anderson, San Jose; Mike M. Masukawa, Los Gatos, both of Calif.

[73] Assignee: FlashPoint Technology, Inc., San Jose, Calif.

[21] Appl. No.: 08/984,704

[22] Filed: Dec. 3, 1997

[51] Int. Cl.[7] .............................. G06T 5/00; H04S 5/262
[52] U.S. Cl. ...................... 382/269; 345/136; 348/239; 348/589
[58] Field of Search .................................. 382/269, 266; 345/136, 144, 470, 467, 441; 358/1.11, 447, 462; 348/239, 589

[56] References Cited

U.S. PATENT DOCUMENTS

| | | | |
|---|---|---|---|
| 4,855,831 | 8/1989 | Miyamoto et al. | 345/137 |
| 5,237,650 | 8/1993 | Priem et al. | 345/441 |
| 5,477,264 | 12/1995 | Sarbadhikari et al. | 348/231 |
| 5,519,815 | 5/1996 | Klassen | 358/1.9 |
| 5,568,167 | 10/1996 | Galbi et al. | 348/589 |
| 5,579,450 | 11/1996 | Hanyu et al. | 395/115 |
| 5,719,967 | 2/1998 | Sekine | 382/266 |
| 5,910,805 | 6/1999 | Hickey et al. | 345/467 |
| 5,940,080 | 8/1999 | Ruehle et al. | 345/136 |

OTHER PUBLICATIONS

Foley et al, "Computer Graphics —Principles and Practice", (1995), pp. 132–137.

*Primary Examiner*—Scott Rogers
*Attorney, Agent, or Firm*—Sawyer Law Group LLP

[57] ABSTRACT

A system and method for anti-aliasing of text overlays on electronic images comprises a text-font manager for loading background color and selected font data which includes font type, font size, and font color, and for obtaining a text string for overlay on the electronic image. The invention also includes a graphics manager for retrieving bit-mapped data for the selected font data and text string and for retrieving current pixel information from the bit-mapped data. The invention further comprises an anti-aliasing module for adjusting the inactive pixels of each character of the character text string based upon the surrounding pixels in the bit-mapped data. The anti-aliasing module overlays the electronic image with the active and adjusted text character pixels. The image merged with text is saved in memory and/or displayed on the electronic imaging display device.

37 Claims, 11 Drawing Sheets

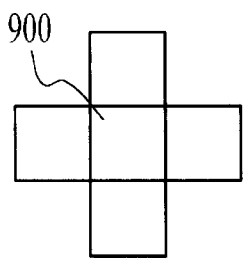
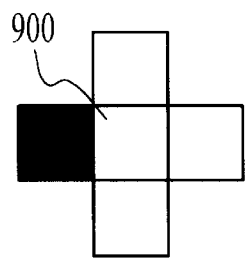
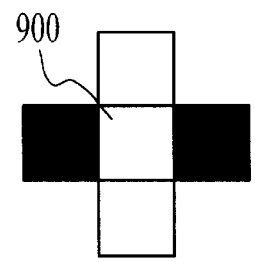
FIG. 9A  FIG. 9B  FIG. 9C
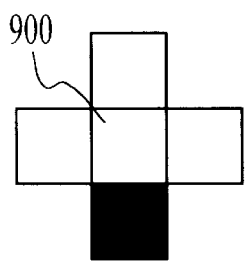
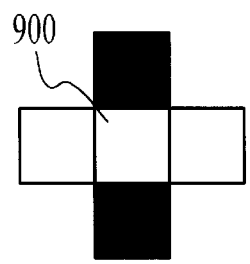
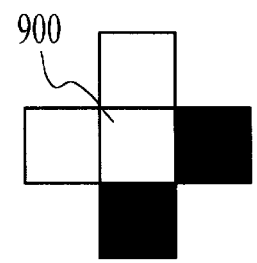
FIG. 9D  FIG. 9E  FIG. 9F
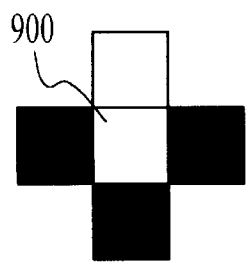
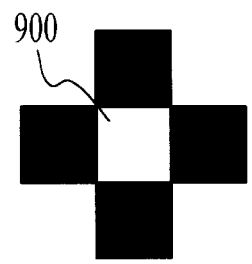
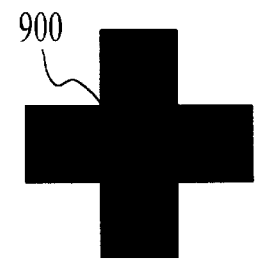
FIG. 9G  FIG. 9H  FIG. 9I

SYSTEM AND METHOD FOR ANTI-ALIASING OF TEXT OVERLAYS ON ELECTRONIC IMAGES

CROSS-REFERENCE TO RELATED APPLICATIONS

This application is related to co-pending U.S. patent application Ser. No. 08/631,173, entitled "Apparatus and Method For Increasing a Digital Camera Image Capture Rate by Delaying Image Processing," filed on Apr. 11, 1996, and co-pending U.S. patent application Ser. No. 08/873,412, entitled "System and Method For Managing Power Conditions Within a Digital Camera Device," filed on Jun. 12, 1997, which are hereby incorporated by reference.

BACKGROUND OF THE INVENTION

1. Field of the Invention

This invention relates generally to electronic imaging devices, and more particularly to a system and method for anti-aliasing of text overlays on electronic images.

2. Description of the Background Art

One problem associated with the display of text stored in bit-mapped fonts is the effect of aliasing of the displayed text characters. Aliasing is the effect of a diagonal edge of a text character appearing to exhibit a number of discrete jumps or "stairsteps" instead of a smooth, straight line. Bit-mapped fonts are highly susceptible to aliasing but have the advantage of being rapidly updated on bit-mapped displays. However, bit-mapped fonts are not easily scaleable as vectored fonts.

Aliased text images are generally considered to be aesthetically unsatisfactory. The degree of "staircasing" is a function of the resolution of the display and the type and size of font being used. While high-solution displays decrease the effect of aliasing of a given font, such displays are expensive. The "staircasing" effect is especially noticeable when bit-mapped text characters are overlaid on graphic images.

Text strings are overlaid on background graphic images to identify the graphic image in some way. For example, such overlays are used to date- and time-stamp the graphic image. To accomplish the overlay, the text color (foreground color) for the text character pixel is merged with the color of the graphic image pixel (background color) for a given location on the graphic image. The background color and foreground color may be merged together in a variety of ways to overlay the graphic image. For example, the foreground color may completely replace the background color. Another approach would be to merge the two colors by arranging the components of the pixel colors together in some fashion. Thus, if the colors are represented in Red, Green, Blue (RGB) format, the "red" components of the two colors are arranged together, the "green" components of the two colors are arranged together, and the "blue" components of the two colors are arranged together. The three resulting values would then be used for the resulting foreground pixel color to replace the background color on the graphic image.

Furthermore, when image files are stored in a compressed format such as Joint Photographic Experts Group (JPEG), the compression aggravates the effect of the aliasing of the text. In many applications, therefore, vectored fonts are used which require more storage and are slower loading than bit-mapped fonts.

What has been lacking in the art is a quick anti-aliasing method for incorporating bit-mapped fonts with text overlays onto electronic images, especially images that are to be compressed with JPEG or similar formats.

SUMMARY OF THE INVENTION

The present invention relates generally to electronic imaging devices, including digital cameras. The present invention comprises as system and method for anti-aliasing of text overlays on electronic images.

In the preferred embodiment of the present invention, the text-font manager loads a pre-selected background color and selected font data that includes font type, font size, and font color. The text-font manager then obtains the text string to be overlaid on the electronic image. During camera operation, the text string is either generated automatically by the camera computer or input by the user.

The anti-aliasing module then retrieves a text character from the text string. The anti-aliasing module sequentially retrieves each character in the text string from the left-most to the right-most character in the string. Following this, the anti-aliasing module responsively retrieves the bit-mapped data for the current character from the text-font manager. For implementations that use languages with right to left orientations, the anti-aliasing module retrieves the entire character string and then reads each character from right to left. The anti-aliasing module then sequentially retrieves each pixel in the bit-mapped data for the given text character.

The bit-mapped data for a character is the internal representation of the character on a pixel by pixel basis for a given font size and type. Each character in a bit-mapped data set defines a set of pixels, row-by-row and column-by-column, as either active or inactive. If a pixel is set as active, that pixel would be displayed as the text color, while a pixel that is set as inactive would be displayed as the background color. Thus, the inactive pixel would be displayed as the background color or be one-hundred percent transparent while the active pixel would be displayed as the text color or be one-hundred percent opaque.

For each pixel in the bit-mapped data, the anti-aliasing module determines if the current pixel is active or inactive. If the current pixel is inactive, the anti-aliasing module performs a routine to determine if the current pixel should be adjusted to compensate for the aliasing effect of the text.

To determine if the inactive current pixel should be adjusted, the anti-aliasing module first initializes a pixel counter to zero. The anti-aliasing module then checks the pixels to the left and to the right of the current pixel in the bit-mapped data. If either pixel to the right or to the left of the current pixel is active, the pixel counter is incremented by one. The anti-aliasing module then checks the pixels above and below the current pixel in the bit-mapped data. If either pixel is active, the pixel counter is further incremented by one. The anti-aliasing module then checks the value of the pixel counter. If the pixel counter is still zero, the current pixel is not adjusted. However, if the pixel counter is greater than zero (i.e., one or two), the anti-aliasing module merges the font color with the background color in pre-defined ratios, depending upon the value of the pixel counter. If the pixel counter is one, the anti-aliasing module adjusts the font color with the background color in a ratio of 20% font color to 80% background color. If, on the other hand, the pixel counter is two, the anti-aliasing module adjusts the font color with the background color in a ratio or 50% font color to 50% background color.

If the current pixel is either active or has been adjusted during the execution of the anti-aliasing method steps, the anti-aliasing module overlays the electronic image with the adjusted or active pixel at the image data pixel location. The anti-aliasing module repeats the process described for every pixel of the character and each character data in the text string. The overlaid image data is stored in computer memory or displayed on the imaging device display.

BRIEF DESCRIPTION OF THE DRAWINGS

FIGS. 9(a) through 9(i), are drawings of exemplary combinations of active and inactive pixels surrounding a current pixel of interest for the present invention.

DETAILED DESCRIPTION OF THE PREFERRED EMBODIMENT

The present invention relates to an improvement in digital imaging devices, including digital cameras. The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. That is, any image capture device which displays images, icons and/or other items, could incorporate the features described hereinbelow and that device would be within the spirit and scope of the present invention. Thus, the present invention is not intended to be limited to the embodiment shown but is to be accorded the widest scope consistent with the principles and features described herein.

The present invention comprises a system and method for anti-aliasing of text overlays of electronic images. The invention comprises a text-font manager for loading background color and selected font data which includes font type, font size, and font color, and for obtaining a text string for overlay on the electronic image. The invention also includes a graphics manager for retrieving bit-mapped data for the selected font data and text string and for retrieving current pixel information from the bit-mapped data. The invention further comprises an anti-aliasing module for adjusting the inactive pixels of each character of the character text string based upon the surrounding pixels in the bit-mapped data. The anti-aliasing module overlays the electronic image with the active and adjusted text character pixels. The overlaid image is saved in memory and/or displayed on an electronic imaging display device such as an LCD.

Figure 1:
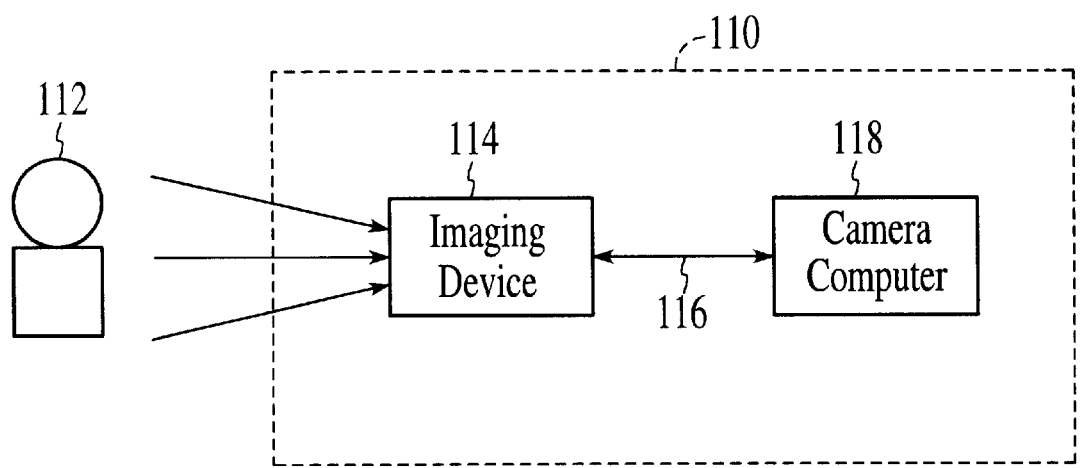
FIG. 1 is a block diagram of a digital camera, according to the present invention.

Referring to FIG. 1, a block diagram of a digital camera 110 connected to host computer 120 is shown. Camera 110 preferably comprises an imaging capture device 114, a system bus 116, and a camera computer 118. Imaging capture device 114 is optically coupled to an object 112 and electrically coupled via system bus 116 to camera computer 118. Once a user has focused imaging capture device 114 on object 112 and instructed camera 110 to capture an image of object 112, camera computer 118 commands imaging capture device 114 via system bus 116 to capture raw image data representing object 112. The captured raw image data is transferred over system bus 116 to camera computer 118 which performs various image processing functions on the image data. System bus 116 also passes various status and control signals between imaging capture device 114 and camera computer 118.

Figure 2:
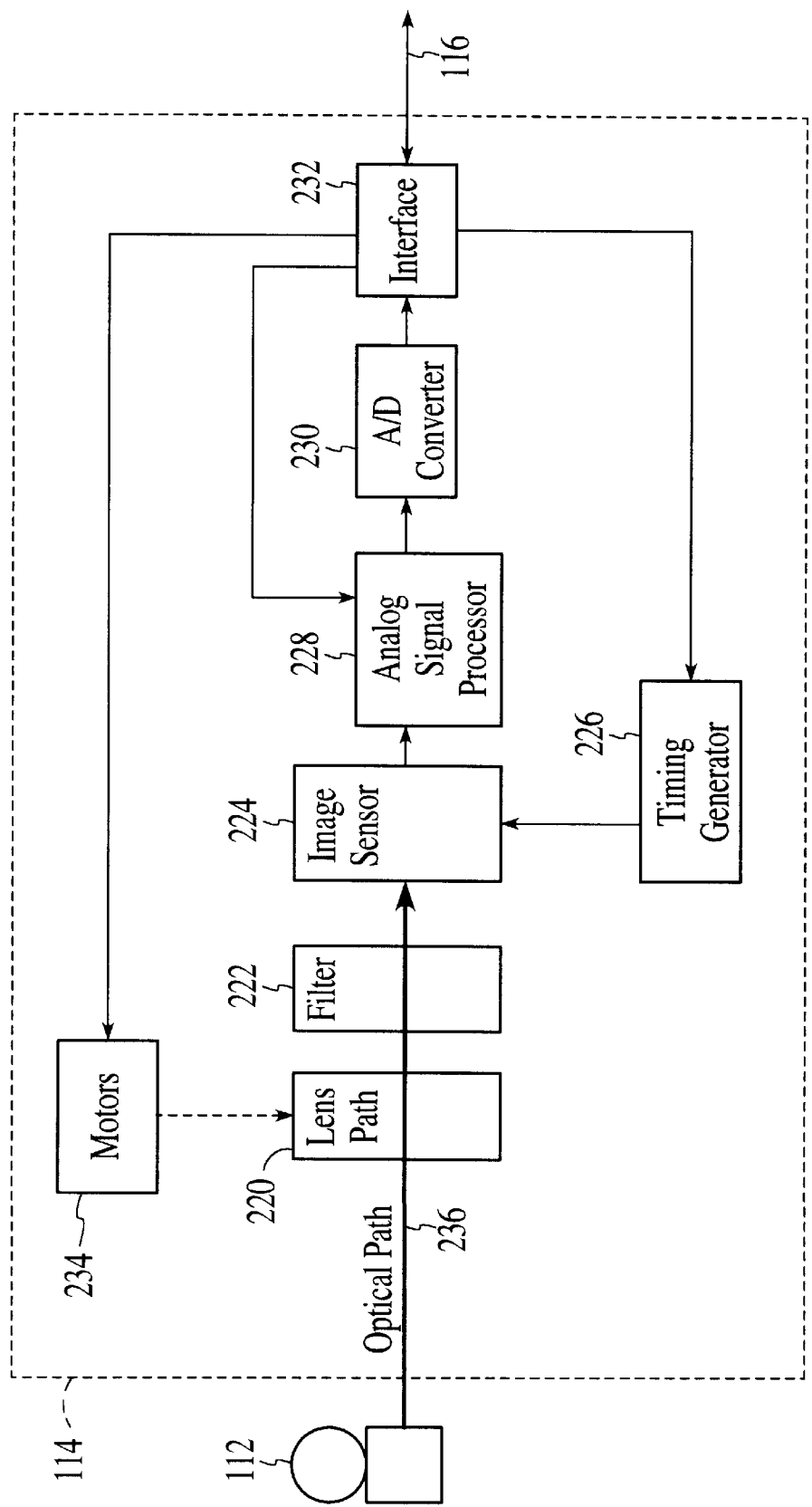
FIG. 2 is a block diagram of the imaging device of FIG. 1.

Referring now to FIG. 2, a block diagram of one embodiment of imaging capture device 114 is shown. Imaging capture device 114 typically comprises a lens 220 having an iris (not shown), a filter 222, an image sensor 224, a timing generator 226, an analog signal processor (ASP) 228, an analog-to-digital (A/D) converter 230, an interface 232, and one or more motors 234 to adjust focus of lens 220.

Imaging capture device 114 captures an image of object 112 via reflected light impacting image sensor 224 along optical path 236. Image sensor 224, which is typically a charged-coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to camera computer 118.

Figure 3:
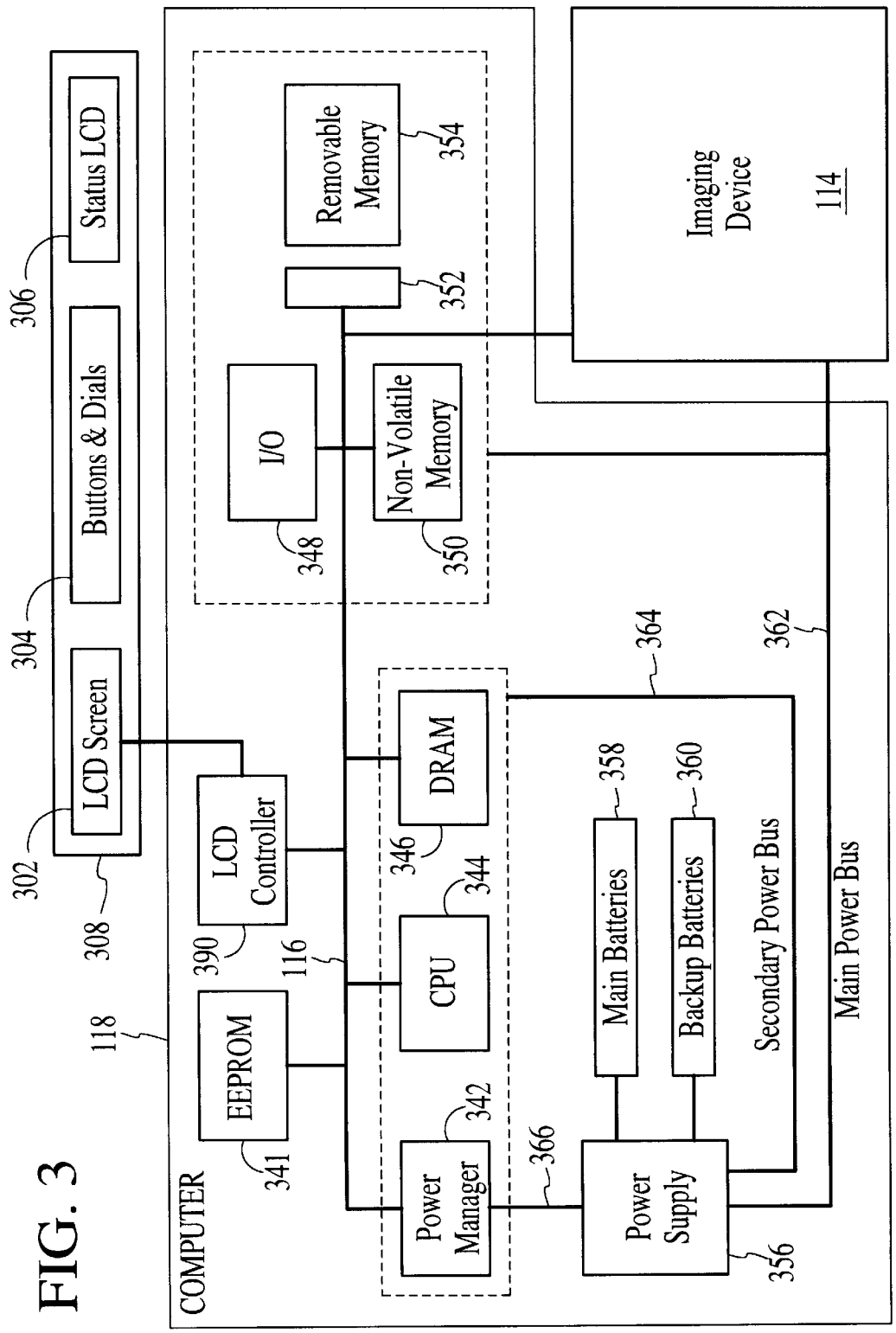
FIG. 3 is a block diagram of the camera computer of FIG. 1.

Referring now to FIG. 3, a block diagram of one embodiment for camera computer 118 is shown. System bus 116 provides connection paths between imaging capture device 114, electrically-erasable programmable read-only memory (EEPROM) 341, optional power manager 342, central processing unit (CPU) 344, dynamic random-access memory (DRAM) 346, camera input/output (I/O) 348, non-volatile memory 350, and buffers/connector 352. Removable memory 354 connects to system bus 116 via buffers/connector 352. In alternate embodiments, camera 110 may also readily be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory which may be selectively allocated to various storage functions. LCD controller 390 accesses DRAM 346 and transfers processed image data to LCD screen 302 for display.

Camera I/O 348 is an interface device allowing communications to and from camera computer 118. For example, camera I/O 348 permits an external host computer (not shown) to connect to and communicate with camera computer 118. Camera I/O 348 also interfaces with a plurality of buttons and/or dials 304, and an optional status LCD 306, which, in addition to LCD screen 302, are the hardware elements of the camera's user interface 308.

Non-volatile memory 350, which typically comprises a conventional read-only memory or flash memory, stores a set of computer-readable program instructions to control the operation of camera 110. Removable memory 354 serves as an additional image data storage area and is preferably a non-volatile device, readily removable and replaceable by a camera user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 provides operating power to the various components of camera 110 via main power bus 362 and secondary power bus 364. The main power bus 362 provides power to imaging capture device 114, camera I/O 348, non-volatile memory 350 and removable memory 354, while secondary power bus 364 provides power to power manager 342, CPU 344 and DRAM 346.

Power supply 356 is connected to main batteries 358 and also to backup batteries 360. Camera 110 user may also connect power supply 356 to an optional external power source. During normal operation of power supply 356, main batteries 358 provide operating power to power supply 356 which then provides the operating power to camera 110 via both main power bus 362 and secondary power bus 364. During a power failure mode where main batteries 358 have failed (i.e., when their output voltage has fallen below a minimum operational voltage level), backup batteries 360 provide operating power to power supply 356 which then provides operating power only to the secondary power bus 364 of camera 110.

Figure 4:
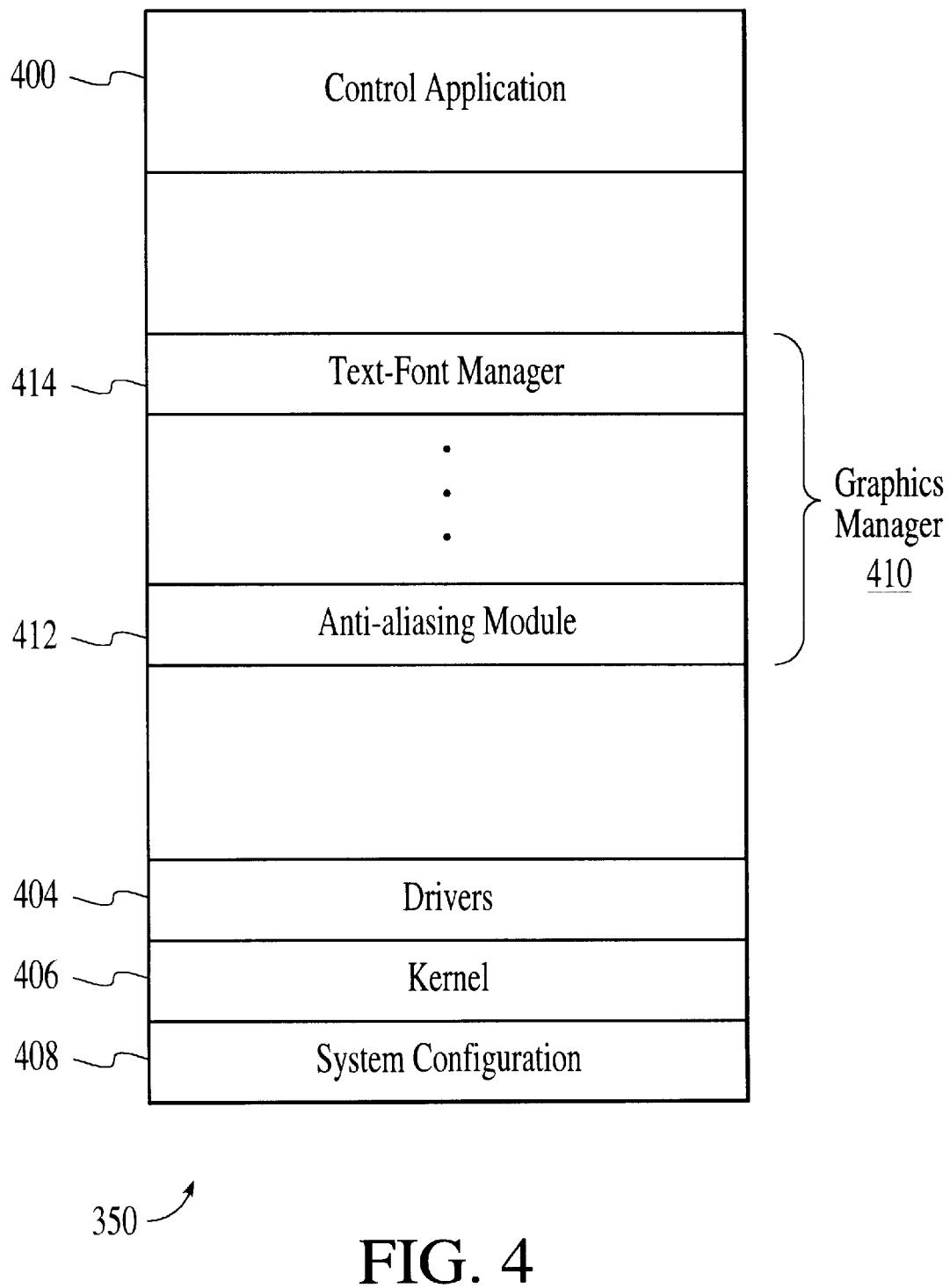
FIG. 4 is a memory map of the non-volatile memory of FIG. 3.

Referring now to FIG. 4, a memory map showing one embodiment of the non-volatile memory 350 is shown, including control application 400, graphics manager 410, drivers 404, kernel 406, and system configuration 408. Control application 400 comprises program instructions for controlling and coordinating the various functions of camera 110. Graphics manager 410 contains selected function modules including anti-aliasing module 412 and text-font manager 414.

Anti-aliasing module 412 includes software routines which coordinate functions related to anti-aliasing of text overlays on electronic images. Text-font manager 414 includes software routines and data structures which provide the information related to the specific text font, font size, and text starting location on the electronic image.

Drivers 404 control various hardware devices within camera 110 (for example, motors 234). Kernel 406 provides basic underlying services for the camera 110 operating system. System configuration 408 performs initial start-up routines for camera 110, including the boot routine and initial system diagnostics.

Figure 5:
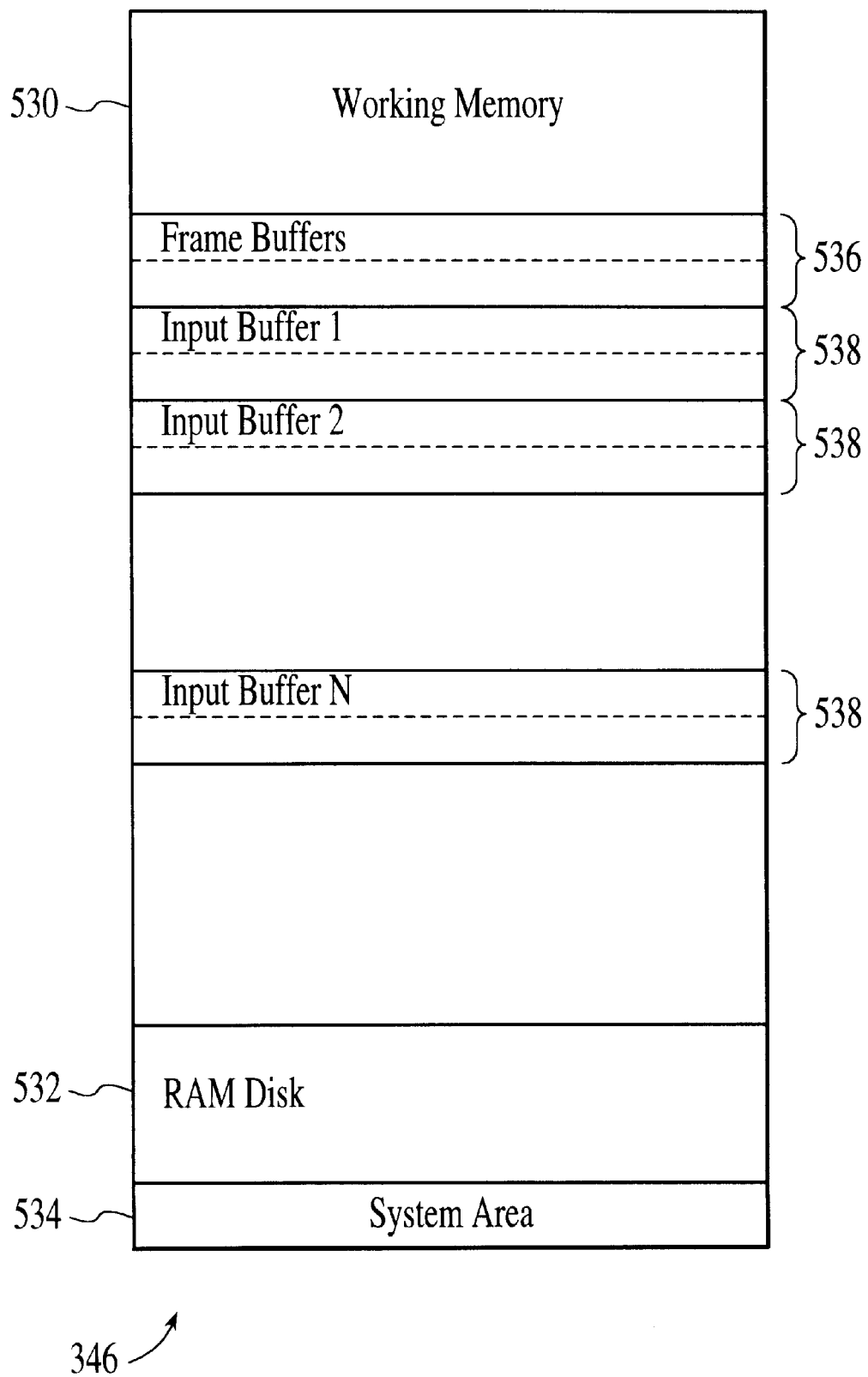
FIG. 5 is a memory map of the dynamic random-access memory of FIG. 3.

Referring now to FIG. 5, a memory map showing one embodiment of dynamic random-access-memory (DRAM) 346 is including RAM disk 532, system area 534, and working memory 530.

RAM disk 532 is a memory area used for storing raw and compressed image data and typically is organized in a "sectored" format similar to that of conventional hard disk drives. In the preferred embodiment, RAM disk 532 uses a well-known and standardized file system to permit external host computer systems, via camera I/O 348, to readily recognize and access the data stored on RAM disk 532. System area 534 stores data regarding system errors (for example, diagnostics as to system shutdown) for use by CPU 344 to restart camera computer 118.

Working memory 530 includes various stacks, data structures and variables used by CPU 344 while executing the software routines used within camera computer 118. Working memory 530 also includes input buffers 538 for initially storing sets of raw image data received from imaging capture device 114 for image conversion, and frame buffers 536 for storing data for display on LCD screen 402.

Figure 6:
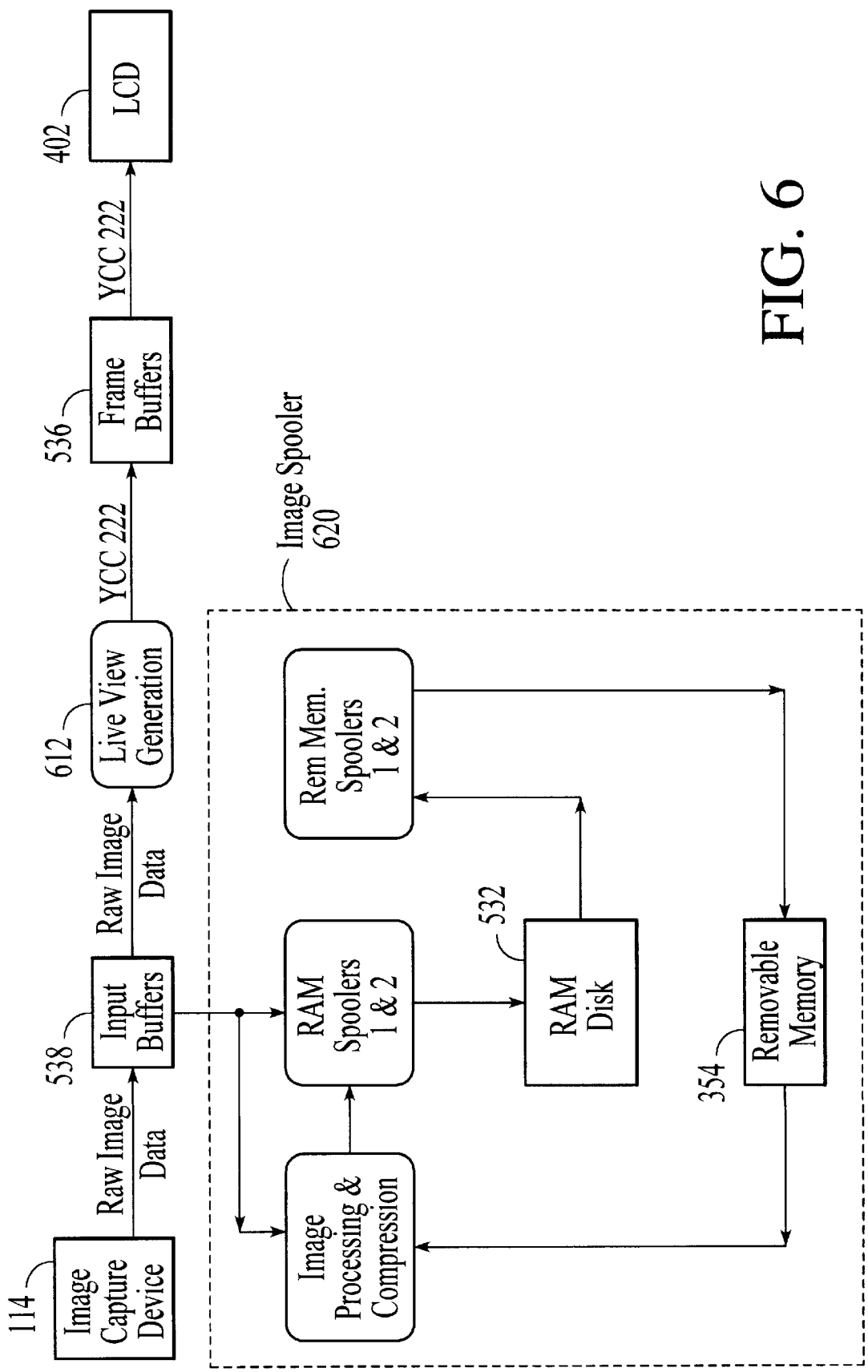
FIG. 6 is a block diagram illustrating the operation of a basic system for the anti-aliasing of text overlays on electronic images.

Referring to FIG. 6, a block diagram of a basic system for anti-aliasing text overlays on electronic images is shown. Imaging capture device 114 transfers raw image data to camera computer 118 which stores the data in input buffers 538.

Camera computer 118 acquires image data from input buffers 538 and responsively generates live view images during live view generation 512. During live view generation 612, CPU 344 takes raw image data from input buffers 538 and performs color space conversion on the image data. First, graphics manager 410 receives a text string from CPU 344. Second, anti-aliasing module 412 adjusts the text string pixel data by anti-aliasing inactive pixels as described in FIGS. 7(a) through 7(c). Third, anti-aliasing module 412 responsively overlays the converted image data with the adjusted text string data. After the completion of color space conversion, CPU 344 responsively stores the converted image data into frame buffers 536. The adjusted image data is transferred to LCD 402 for display.

In an alternative embodiment, camera computer 118 acquires image data from input buffers 538 and responsively processes, compresses, and stores image data via image spooler 620. During image spooler 620 operation, graphics manager 410 receives a text string from CPU 344. Anti-aliasing module 412 adjusts the pixel data of the text string by anti-aliasing inactive pixels as described in FIGS. 7(a) through 7(c). Anti-aliasing module 412 responsively overlays the image data with the adjusted text string pixel data. Image spooler 620 then stores the adjusted image data in removable memory 354 or RAM disk 532.

Figure 7A:
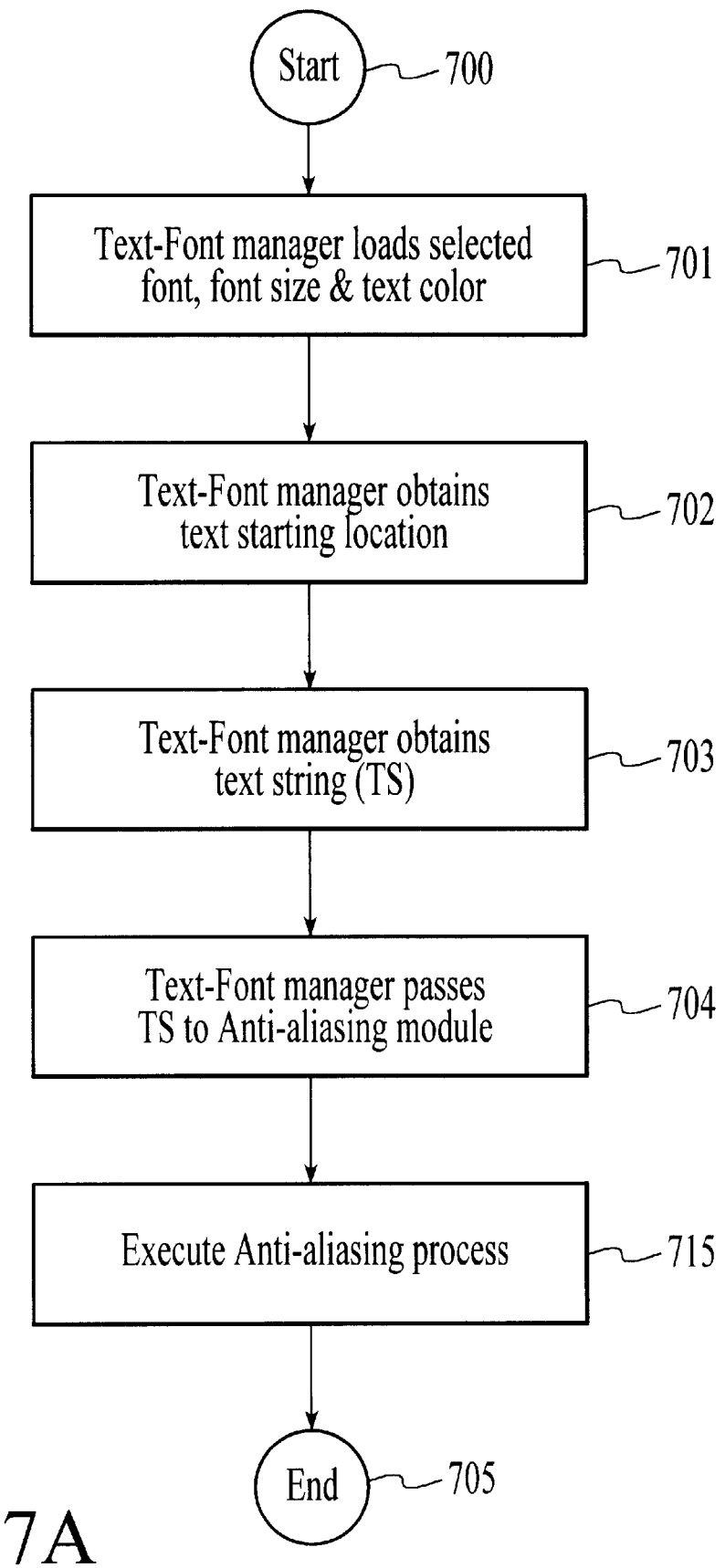
FIG. 7(a) is a flowchart of method steps for the anti-aliasing of text overlays on electronic images, according to the present invention.
Figure 7B:
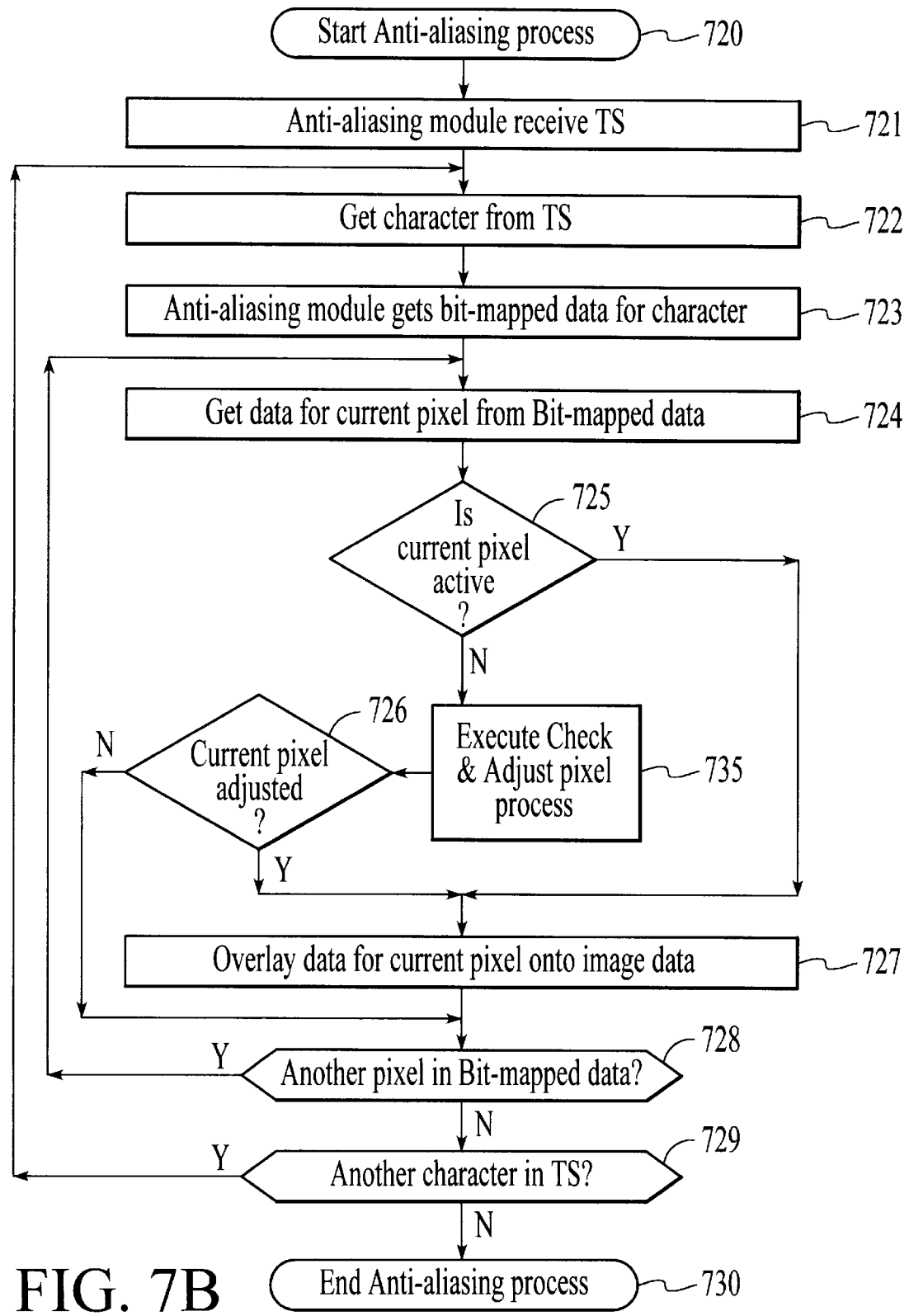
FIG. 7(b) is a flowchart of method steps to perform the anti-aliasing of text overlays on electronic images of FIG. 7(a) in further detail.
Figure 7C:
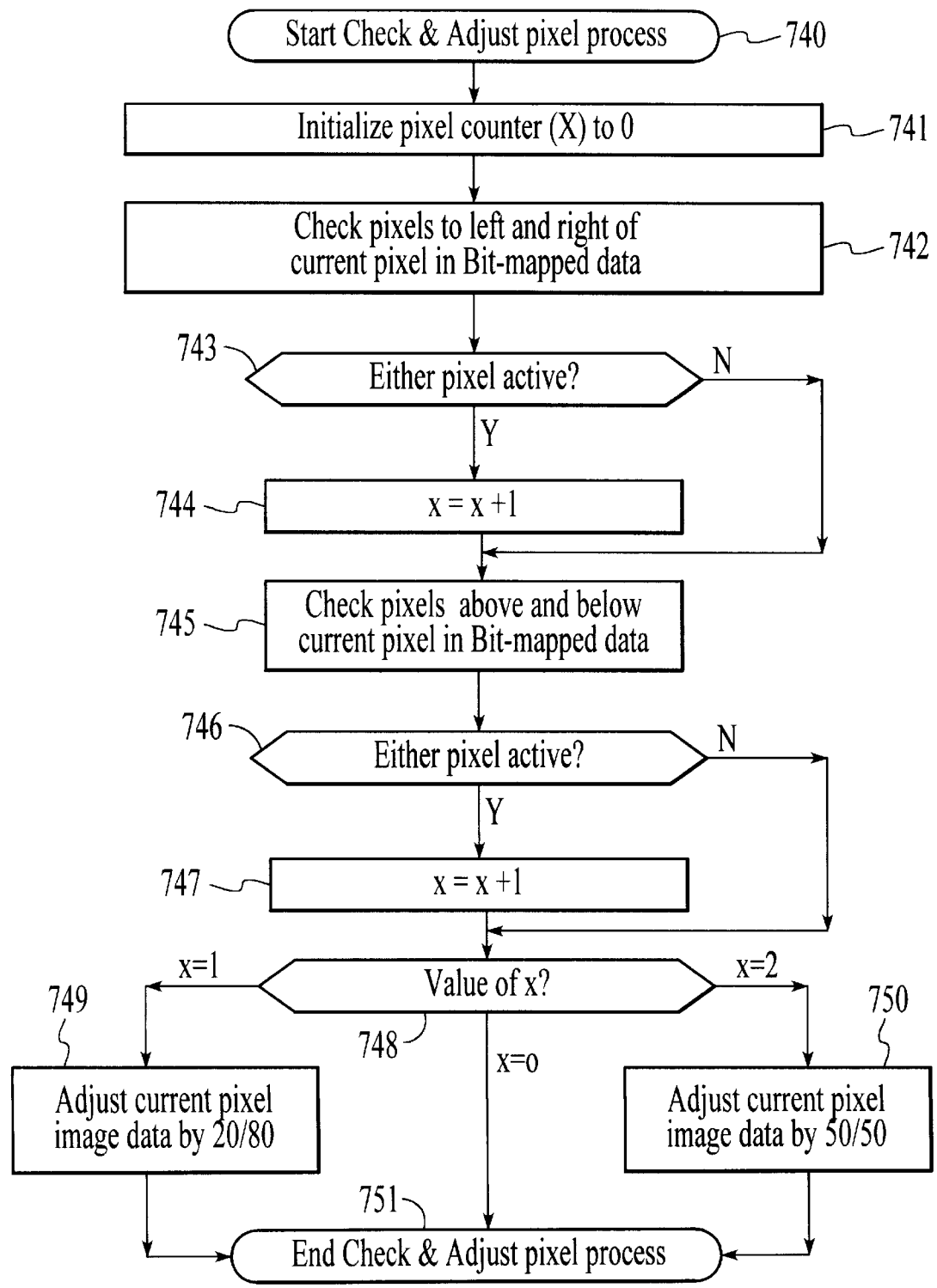
FIG. 7(c) is a flowchart of method steps to perform the check and adjust pixel module for the anti-aliasing of text overlays on electronic images of FIG. 7(b)

Referring now to FIG. 7(a), a flowchart of method steps for the anti-aliasing of text overlays on electronic images is shown. Initially, in step 701, text-font manager 414 begins the anti-aliasing process by loading the selected font type, font size, and text color. The font type, font size, and text color are typically pre-defined by camera 110 implementation but may also be chosen by the user during initial camera 110 start-up. Text color may be black, white, the image background color, or any other color represented in the system.

Next, in step 702, text-font manager 414 obtains the text starting location. The text starting location may be a set location on the image or determined by the user on camera 110 start-up. Then in step 703, text-font manager 414 obtains the text string to be placed on the image. The text string may be generated automatically by camera computer 118 or input by the user during camera 110 operation. The text string may contain any information concerning the image, such as time and date captured, and is placed beginning at the text starting location in the selected font type, font size, and text color; or any other information. Text-font manager 414 passes the text string to anti-aliasing module 412 in step 704.

In step 715, graphics manager 410 executes the anti-aliasing process method steps required for the anti-aliasing of the character pixel data by anti-aliasing module 412, as represented in steps 721 through 729 of FIG. 7(*b*).

Referring now to FIG. 7(*b*), a flowchart of method steps to execute the anti-aliasing process step 715 of FIG. 7(*a*) for anti-aliasing of text overlays on electronic images is shown. Initially, in step 721, anti-aliasing module 412 receives the text string sent from text-font manager 414 as described in step 704 of FIG. 7(*a*).

Next, in step 722, anti-aliasing module 412 extracts a character from the text string. Preferably, anti-aliasing module 412 sequentially extracts each character in the text string starting with the left-most character and proceeding to the right-most character in the string, one character at a time. Then, in step 723, anti-aliasing module 412 responsively retrieves the bit-mapped data for the current character from text-font manager 414.

The bit-mapped data for a character is the internal representation of the character on a pixel by pixel basis for a given font size and type. Each character in a bit-mapped data set defines a set of pixels, row-by-row and column-by-column, as either active or inactive. If a pixel is active, that pixel would be displayed as the text color, while an inactive pixel would be displayed as the background color. Thus, the inactive pixel would be displayed as the background color or be one-hundred percent transparent while the active pixel would be displayed as the text color or be one-hundred percent opaque.

In step 724, anti-aliasing module 412 extracts the first pixel from the retrieved bit-mapped data for the current character. Then, anti-aliasing module 412 determines the status of the current pixel as maintained within the bit-mapped data in step 725 as active or inactive. If the current pixel is inactive, anti-aliasing module 412 executes the check and adjust pixel process steps in step 735. The method steps to perform step 735 are detailed below in reference to FIG. 7(*c*). Anti-aliasing module 412 bypasses step 735, however, if the current pixel is active.

After executing the check and adjust pixel process steps, anti-aliasing module 412 determines if the current text pixel has been adjusted in step 726. If the current text pixel has not been adjusted, anti-aliasing module 412 skips to step 728. However, if the current text pixel has been adjusted, anti-aliasing module 412 continues processing at step 727.

Next, in step 727, anti-aliasing module 412 overlays the current, adjusted text pixel data onto the image data. Anti-aliasing module 412 determines the offset of the current pixel from the text starting location, and tracks the distance (in pixels) from the text starting location for each character in the character string and for each pixel within the bit-mapped data of the current character. Thus, anti-aliasing module 412 knows the exact pixel location in the current image data corresponding to the current pixel within the text string. If the current pixel is active or has been adjusted during the check and adjust pixel process steps, a corresponding image data pixel is overlaid with the current text pixel data.

Next, in step 728, anti-aliasing module 412 determines if there is more pixel data in the bit-mapped data for the current character. If there is more pixel data, anti-aliasing module 412 repeats beginning at step 724. If there is no more pixel data for the current character, anti-aliasing module 412 checks for another character in the text string at step 729. If more characters are present, anti-aliasing module 412 repeats beginning at step 722; otherwise, the anti-aliasing process ends.

Referring now to FIG. 7(*c*), a flowchart of method steps to execute the check and adjust pixel process of anti-aliasing module 412 for the anti-aliasing of text overlays on electronic images is shown. The steps of FIG. 7(*c*) correspond to step 735 of FIG. 7(*b*). Initially, in step 741, anti-aliasing module 412 initializes a pixel counter to zero.

Next, anti-aliasing module 412 checks the pixels to the left and to the right of the current text pixel in the bit-mapped data in step 742. If either the pixel to the left or the pixel to the right is active, anti-aliasing module 412 responsively increments the pixel counter by one in step 744. If both pixels are active, anti-aliasing module 412 preferably still only increments the pixel counter by one. In other embodiments, anti-aliasing module 412 increments the counter for each active pixel surrounding the current text pixel. If neither pixel is active, then anti-aliasing module 412 bypasses step 744 and does not increment the pixel counter. If no pixel is defined or available to the right or to the left, as in the case for a pixel to the left of the first pixel in a row of data, then anti-aliasing module 412 preferably treats such a pixel as inactive. A pixel is active if the pixel is used to define the text character. Thus, if it has been determined that anti-aliasing module 412 is to overlay black text on the image data, then anti-aliasing module 412 overlays black color at the current image data pixel location for an active text pixel in the bit-mapped data.

Anti-aliasing module 412 then checks the pixels above and below the current text pixel in the bit-mapped data in step 745. If either pixel is active, then anti-aliasing module 412 responsively increments the pixel counter by one in step 747. If neither pixel is active, then anti-aliasing module 412 bypasses step 747 and does not increment the pixel counter.

Next, in step 748, anti-aliasing module 412 checks the value of the pixel couriter. If the pixel counter has a value of one, then anti-aliasing module 412 responsively adjusts the current image data pixel color by a 20/80 mixture of text color to background color at step 749. In this step, anti-aliasing module 412 adjusts the current image data pixel color by blending the background color, which may be white, black, the color of the image pixel, or another color, with the pre-determined text color. For example, if the background color is set as white and the text color is set as black, anti-aliasing module 412 overlays the current image data pixel with twenty percent gray color. Anti-aliasing module 412 overlays this adjusted color onto the current image data as described at step 726 of FIG. 7(*b*).

If at step 748 anti-aliasing module 412 finds that the pixel counter has a value of two, then anti-aliasing module 412 responsively adjusts the current pixel color by a 50/50 mixture of text color to background color at step 750. Finally, if anti-aliasing module 412 determines that the pixel counter has a value of zero, then anti-aliasing module 412 does not adjust the current image pixel data.

Figure 8:
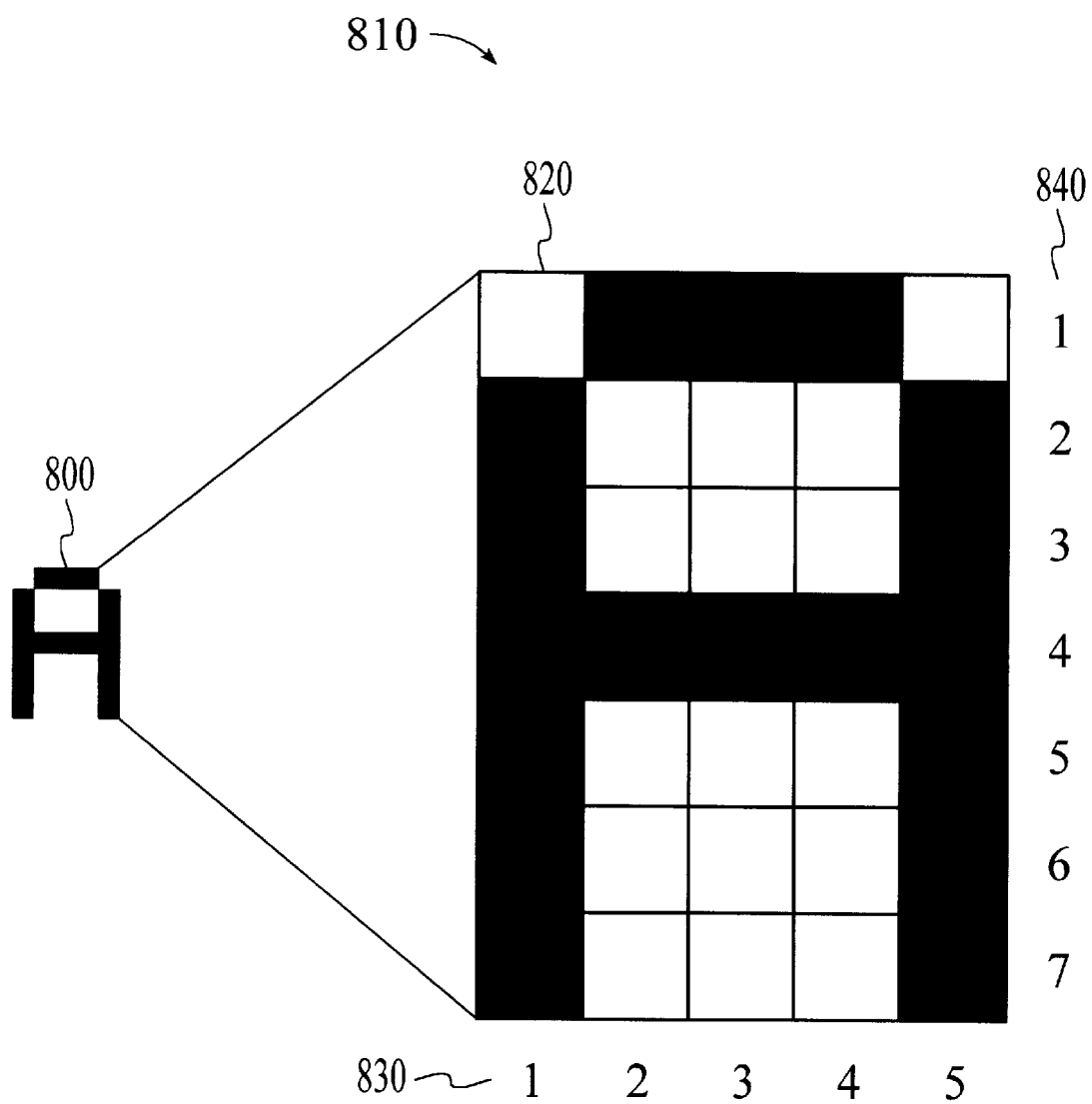
FIG. 8 is a representation of stored text data in pixilated form.

Referring now to FIG. 8, a representation of a text character 800 in bit-mapped form is shown. Text character 800 is represented in an expanded form as pixilated character 810. Pixilated character 810 is represented by a plurality of pixel rows 840 and a plurality of pixel columns 830. During execution of anti-aliasing module 412 method steps, anti-aliasing module 412 preferably accesses the pixels of pixilated character 810 starting with first data pixel 820 at row 1, column 1. Anti-aliasing module 412 sequentially proceeds through the first row of pixels 840 from the first column 830 of pixels through the last column 830 of pixels, then through the succeeding rows 840 of pixels, until all rows 840 and columns 830 of pixilated character 810 have been accessed. In this representation, active pixels are shown as black or dark squares while inactive pixels are shown as white squares. The borders of the squares, shown as black lines, are for illustrative purposes only and are not part of the bit-mapped data of the preferred embodiment.

Referring now to FIGS. 9(a) through 9(i), drawings of exemplary combinations of active and inactive pixels surrounding current text pixel 900 are shown. In the FIGS. 9(a) through 9(i) representations, active pixels are shown as black or dark squares and inactive pixels are shown as white squares. FIGS. 9(a) through 9(h) represent exemplary conditions when current text pixel 900 is inactive and anti-aliasing module 412 checks the surrounding pixels contained in the bit-mapped data as discussed in steps 741 through 751 of FIG. 7(c). In FIG. 9(a), current text pixel 900 is surrounded by inactive pixels and, thus, anti-aliasing module 412 would not increment the pixel counter or adjust the text character data in this example.

In FIGS. 9(b) and 9(c), anti-aliasing module 412 increments the pixel counter by one as either the pixel to the left or the pixel to the right of current text pixel 900 is active in these examples. Similarly, in FIGS. 9(d) and 9(e), anti-aliasing module 412 increments the pixel counter by one as either the pixel above or the pixel below current text pixel 900 is active in these examples. In all four of the examples of FIGS. 9(b) to 9(e), the current image data pixel corresponding to current text pixel 900 would be adjusted by a 20/80 mixture of text color to background color, as discussed at step 749 of FIG. 7(c). Anti-aliasing module 412 only adjusts the current image data pixel and does not adjust the current text pixel 900 of the bit-mapped data.

FIGS. 9(f) through 9(h) represent situations where either pixel to the left or right of current text pixel 900 is active and where either pixel above or below current text pixel 900 is active. In these exemplary representations, anti-aliasing module 412 increments the pixel counter to two, as discussed in steps 743 and 746 of FIG. 7(c), and anti-aliasing module 412 adjusts the current image data pixel by a mixture of 50/50 text color to background color as discussed at step 750 of FIG. 7(c).

Finally, FIG. 9(i) represents the exemplary situation where current text pixel 900 is active. In the FIG. 9(i) representation, anti-aliasing module 412 would not adjust the current image data pixel as discussed at step 725 of FIG. 7(b).

Thus, the invention preferably provides a quick anti-aliasing method for incorporating bit-mapped fonts with text overlays onto electronic images.

The invention has been explained above with reference to a Preferred embodiment. Other embodiments will be apparent to those skilled in the art in light of this disclosure. For example, the present invention may readily be implemented using configurations other than those described in the preferred embodiment above. Additionally, the present invention may effectively be used in combination with systems other than the one described above as the preferred embodiment. Therefore, these and other variations upon the preferred embodiments are intended to be covered by the present invention, which is limited only by the appended claims.

What is claimed is:

1. A method for anti-aliasing text overlays on electronic images comprising the steps of:

loading a selected background color and selected font data wherein said font data consists of font type, font size, and font color;

obtaining a text string for said text overlay;

retrieving bit-mapped data for said selected font data and said text string;

retrieving a current pixel from a plurality of pixels of said bit-mapped data;

adjusting said current pixel based upon said bit-mapped data and a corresponding image data pixel in said electronic image, producing an adjusted current pixel; and overlaying said adjusted current pixel onto said corresponding image data pixel in said electronic image.

2. The method of claim 1, further comprising the steps of:

retrieving a first text character from said text string; and retrieving said bit-mapped data for said first text character.

3. The method of claim 2, wherein said step of retrieving of said text character is performed for each successive character in said text string.

4. The method of claim 1, wherein said step of retrieving said current pixel is performed sequentially for each pixel in said bit-mapped data.

5. The method of claim 1, further comprising the step of:

determining the status of said current pixel as active or inactive.

6. The method of claim 5, wherein said adjusting of said current pixel is performed only if said current pixel is inactive.

7. The method of claim 5, wherein said overlaying of said current pixel is performed only if said current pixel is active or if said current pixel is adjusted.

8. The method of claim 1, further comprising the steps of:

initializing a pixel counter;

checking a plurality of neighboring pixels surrounding said current pixel;

incrementing said pixel counter if said plurality of neighboring pixels are active; and adjusting said current pixel if said pixel counter is not zero.

9. The method of claim 1, further comprising the steps of:

checking a first set of neighboring pixels;

incrementing a pixel counter if either pixel of said first set of neighboring pixels is active;

checking a second set of neighboring pixels; and incrementing said pixel counter if either pixel of said second set of neighboring pixels is active.

10. The method of claim 9, wherein said first set of neighboring pixels are the pixels immediately adjacent to the left and to the right of said current pixel in said bit-mapped data.

11. The method of claim 9, wherein said second set of neighboring pixels are the pixels immediately adjacent above and below said current pixel in said bit-mapped data.

12. The method of claim 9, further comprising the steps of:

determining the value of said pixel counter; and adjusting said current pixel based upon the value of said pixel counter.

13. The method of claim 12, further comprising the step of:

adjusting said current pixel by merging said text color with said background color.

14. A system for anti-aliasing text overlays on electronic images comprising:

a text-font manager for loading a selected background color and selected font data, said font data consisting of font type, font size, and font color; and for obtaining a text string for said text overlay;

a graphics manager coupled to said text-font manager for retrieving bit-mapped data for said selected font data and said text string, and for retrieving a current pixel from a plurality of pixels of said bit-mapped data; and an anti-aliasing module coupled to said graphics manager for adjusting said current pixel based upon said bit-mapped data and a corresponding image data pixel in said electronic image, producing an adjusted current pixel, and for overlaying said adjusted current pixel onto said corresponding image data pixel in said electronic image.

15. The system of claim 14, wherein said anti-aliasing module:

extracts a text character from said text string; and retrieves said bit-mapped data for said text character.

16. The system of claim 15, wherein said anti-aliasing module sequentially extracts each of said text characters in said text string.

17. The system of claim 14, wherein said anti-aliasing module retrieves said current pixel for each pixel in said bit-mapped data.

18. The system of claim 14, wherein said anti-aliasing module determines the status of said current pixel.

19. The system of claim 18, wherein said anti-aliasing module adjusts said current pixel only if said current pixel is inactive.

20. The system of claim 18, wherein said anti-aliasing module overlays said current pixel only if said current pixel is active or if said current pixel is adjusted.

21. The system of claim 14, wherein said anti-aliasing module:

initializes a pixel counter;

checks a plurality of neighboring pixels surrounding said current pixel;

increments said pixel counter if said plurality of neighboring pixels are active; and adjusts said current pixel if said pixel counter is not zero.

22. The system of claim 14, wherein said anti-aliasing module:

checks a first set of neighboring pixels;

increments a pixel counter if either pixel of said first set of neighboring pixels is active;

checks a second set of neighboring pixels; and increments said pixel counter if either pixel of said second set of neighboring pixels is active.

23. The system of claim 22, wherein said first set of neighboring pixels are the pixels immediately adjacent to the left and to the right of said current pixel in said bit-mapped data.

24. The system of claim 22, wherein said second set of neighboring pixels are the pixels immediately adjacent above and below said current pixel in said bit-mapped data.

25. The system of claim 22, wherein said anti-aliasing module:

determines the value of said pixel counter; and adjusts said current pixel based upon the value of said pixel counter.

26. The system of claims 25, wherein said anti-aliasing module adjusts said current pixel by combining said text color with said background color.

27. The system of claims 25, wherein said pixel counter has a value of one.

28. The system of claim 25, wherein said anti-aliasing module merges said text color with said background color at a ratio of 20% text color to 80% background color.

29. The system of claims 25, wherein said pixel counter has a value of two.

30. The system of claim 29, wherein said anti-aliasing module merges said text color with said background color at a ratio of 50% text color to 50% background color.

31. The system of claim 21, wherein said anti-aliasing module increments said pixel counter for all of said active neighboring pixels.

32. A system for anti-aliasing text overlays on electronic images comprising:

means for loading a selected background color and selected font data wherein said font data consists of font type, font size, and font color;

means for obtaining a text string for said text overlay;

means for retrieving bit-mapped data for said selected font data and said text string;

means for retrieving a current pixel from a plurality of pixels of said bit-mapped data;

means for adjusting said current pixel based upon said bit-mapped data and a corresponding image data pixel in said electronic image, producing an adjusted current image; and means for overlaying said adjusted current pixel onto said corresponding image data pixel in said electronic image.

33. A computer-readable medium comprising program instructions for anti-aliasing text overlays on electronic images by performing the steps of:

loading a selected background color and selected font data, said front data consisting of font type, font size, and font color;

obtaining a text string for said text overlay;

retrieving bit-mapped data for said selected font data and text string;

retrieving a current pixel from a plurality of pixels of said bit-mapped data;

adjusting said current pixel based upon said bit-mapped data and a corresponding pixel in said electronic image, producing an adjusted current pixel; and overlaying said adjusted current pixel onto said electronic image.

34. A method for anti-aliasing text overlays on electronic images comprising the steps of:

loading a selected background color and selected font data wherein said font data consists of font type, font size, and font color;

obtaining a text string for said text overlay;

retrieving bit-mapped data for said selected font data and said text string;

retrieving a current pixel from a plurality of pixels of said bit-mapped data;

initializing a pixel counter;

checking a plurality of neighboring pixels surrounding said current pixel;

incrementing said pixel counter if said plurality of neighboring pixels are active;

adjusting said current pixel if said pixel counter is not zero based upon said bit-mapped data and a corresponding image data pixel in said electronic image, producing an adjusted current pixel; and;

overlaying said adjusted current pixel onto said corresponding image data pixel in said electronic image.

35. A system for anti-aliasing text overlays on electronic images comprising:

a text-font manager for loading a selected background color and selected font data, said font data consisting of font type, font size, and font color; and for obtaining a text string for said text overlay;

a graphics manager coupled to said text-font manager for retrieving bit-mapped data for said selected font data and said text string, and for retrieving a current pixel from a plurality of pixels of said bit-mapped data; and an anti-aliasing module coupled to said graphics manager for adjusting said current pixel, wherein said anti-aliasing module includes initializing a pixel counter, checking a plurality of neighboring pixels surrounding said current pixel, incrementing said pixel counter if said plurality of neighboring pixels are active, adjusting said current pixel if said pixel counter is not zero based upon said bit-mapped data and a corresponding image data pixel in said electronic image, producing an adjusted current pixel, and for overlaying said adjusted current pixel onto said corresponding image data pixel in said electronic image.

36. A system for anti-aliasing text overlays on electronic images comprising:

means for loading a selected background color and selected font data wherein said font data consists of font type, font size, and font color;

means for obtaining a text string for said text overlay;

means for retrieving bit-mapped data for said selected font data and said text string;

means for retrieving a current pixel from a plurality of pixels of said bit-mapped data;

means for initializing a pixel counter;

means for checking a plurality of neighboring pixels surrounding said current pixel;

means for incrementing said pixel counter if said plurality of neighboring pixels are active;

means for adjusting said current pixel if said pixel counter is not zero based upon said bit-mapped data and a corresponding image data pixel in said electronic image, producing an adjusted current image; and means for overlaying said adjusted current pixel onto said corresponding image data pixel in said electronic image.

37. A computer-readable medium comprising program instructions for anti-aliasing text overlays on electronic images by performing the steps of:

loading a selected background color and selected font data, said font data consisting of font type, font size, and font color;

obtaining a text string for said text overlay;

retrieving bit-mapped data for said selected font data and text string;

retrieving a current pixel from a plurality of pixels of said bit-mapped data;

initializing a pixel counter;

checking a plurality of neighboring pixels surrounding said current pixel;

incrementing said pixel counter if said plurality of neighboring pixels are active;

adjusting said current pixel if said pixel counter is not zero based upon said bit-mapped data and a corresponding pixel in said electronic image, producing an adjusted current pixel; and overlaying said adjusted current pixel onto said electronic image.

* * * * *